Oct. 4, 1960 J. F. ZISKAL 2,954,837
HYDRAULIC POWER STEERING SYSTEM
Filed July 19, 1957 5 Sheets-Sheet 1

Inventor:
Joseph F. Ziskal
Paul O. Pippel
Atty.

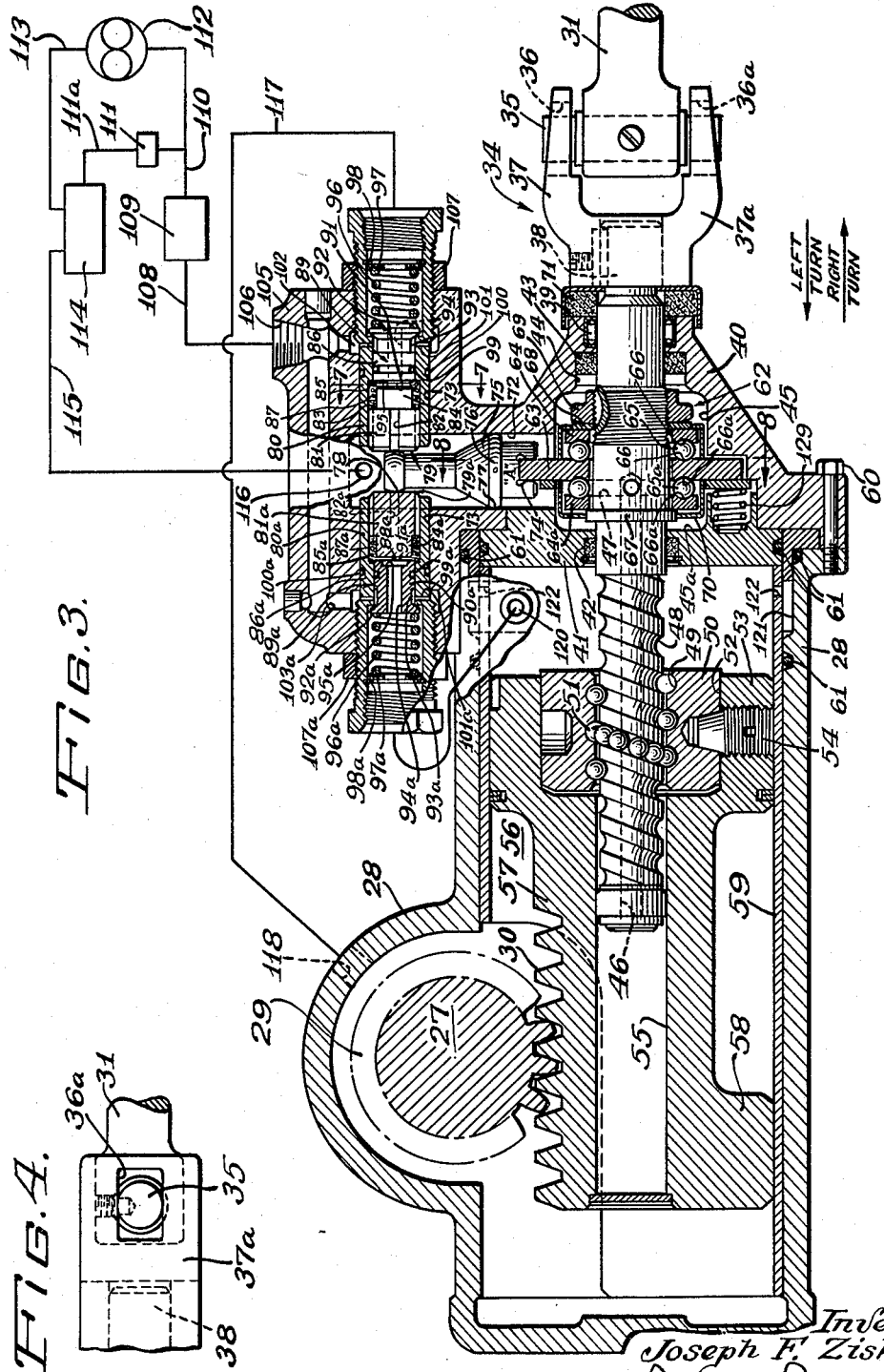

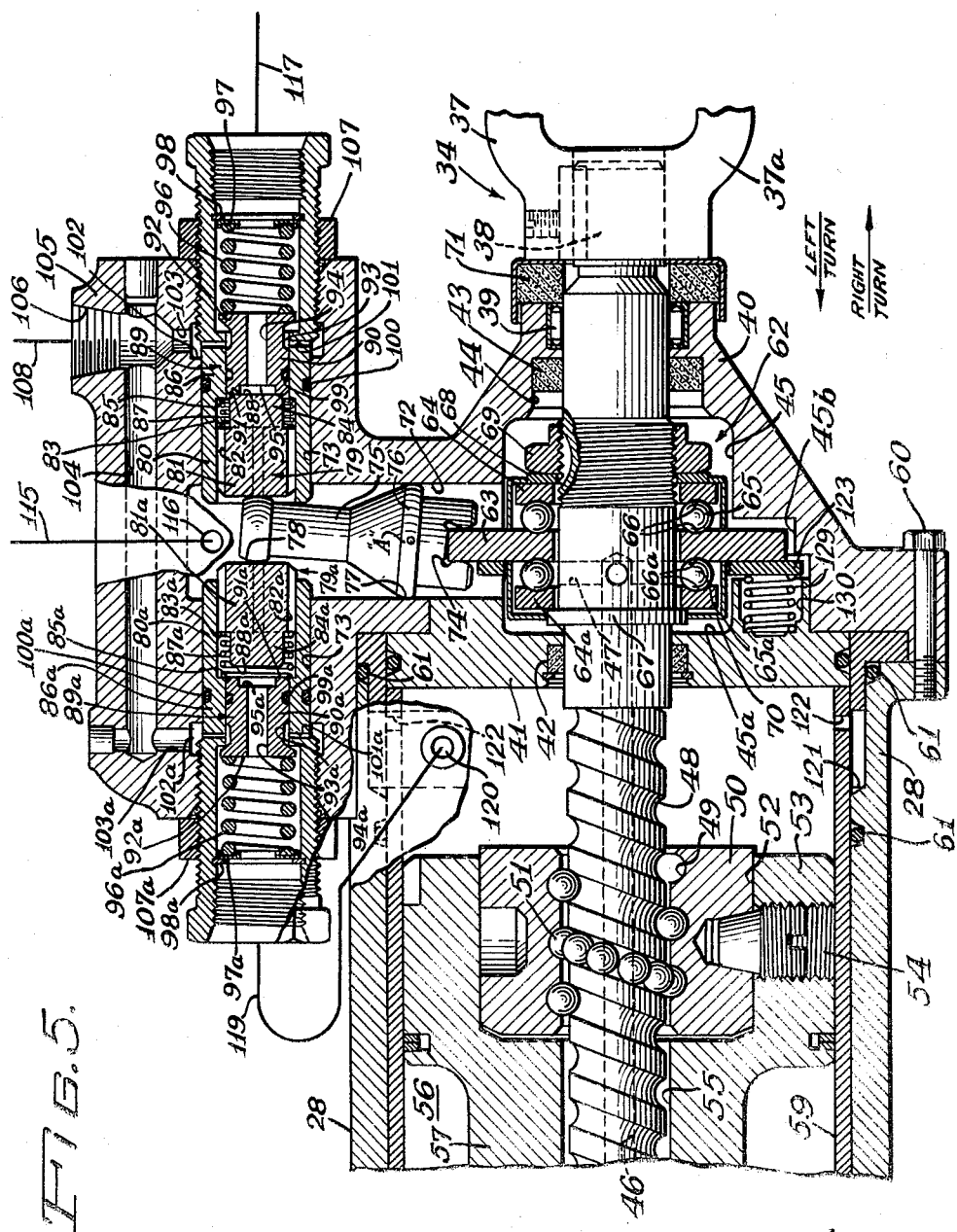

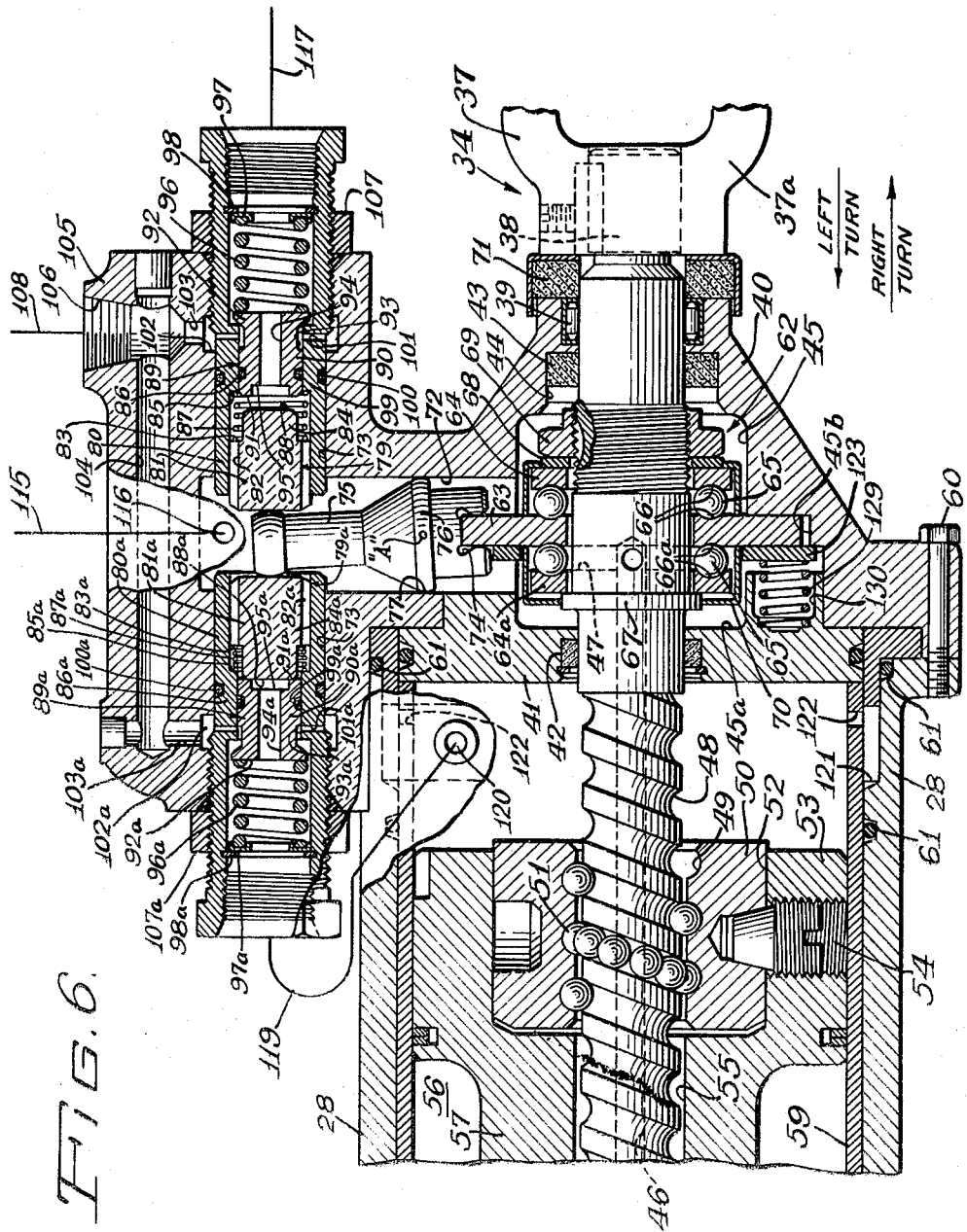

Oct. 4, 1960

J. F. ZISKAL 2,954,837

HYDRAULIC POWER STEERING SYSTEM

Filed July 19, 1957

Inventor:
Joseph F. Ziskal

United States Patent Office 2,954,837
Patented Oct. 4, 1960

2,954,837

HYDRAULIC POWER STEERING SYSTEM

Joseph F. Ziskal, Sprotboro, Doncaster, England, assignor to International Harvester Company, Chicago, Ill., a corporation of New Jersey Filed July 19, 1957, Ser. No. 673,086

11 Claims. (Cl. 180—79.2)

This invention relates to hydraulic mechanism, and is more particularly directed to power steering units of the type suitable for incorporation into the steering assemblies of vehicles.

In the past a great variety of power steering mechanisms have been developed but, even though some found popular favor, most of these prior art devices contained inherent characteristics and deficiencies which, it is acknowledged, seriously limited their unqualified acceptance. Perhaps the most objectionable of these drawbacks arises from the fact that sensitive control of the vehicle is somewhat limited because, by the nature of the mechanisms, the operator does not have the "feel" of the road when driving. The inability of the operator to feel, through the steering mechanism and on the steering wheel, the reaction caused by variations of the road surface considerably limits the sensitivity of the steering mechanism, and, accordingly, limits the ability of the operator to exercise the degree of control thereover that is believed to be desirable. Another of the drawbacks of these previous devices stems from the limitations imposed because of the type system for which they were developed. Heretofore, power steering mechanisms for vehicles were designed primarily for use in systems of the open-center type with constant flow of fluid through the control valves and were not readily adaptable for systems wherein an accumulator was employed. As a consequence, most of these mechanisms are not suitable for use with the type of hydraulic systems, currently popular in vehicles, that provide a single source of fluid pressure and have a multiplicity of hydraulically actuated devices that are operated therefrom through an accumulator device.

The present invention, therefore, is concerned primarily with the provision of an hydraulically actuated power steering mechanism that is suitable for use with an accumulator type of hydraulic system, and wherein a reaction within the mechanism, upon turning of the steerable wheels thereof, becomes effective for creating a sense of feel that is manifested to the operator at the operator's steering control wheel.

An important object thereof is to provide a power steering mechanism employing a hydraulic motor wherein the fluid on either side of the piston therein is always in free communication with the reservoir source of said fluid whenever the associated vehicle is tracking down or following a straight path.

A specific object is to provide a valve mechanism in a power steering unit in which a pair of oppositely positioned and coaxially arranged inlet valves are provided each with an axially extending centrally disposed opening, while a pair of oppositely positioned and coaxially arranged exhaust valves are each provided with a plurality of axially extending external flutes thereon, and which flutes cooperate with said centrally disposed openings, to define passages in selective positions of said valves, for the transmission of fluid therethrough.

Another important object is to provide a hydraulic power steering unit having means therein for metering fluid flow so as to permit only a predetermined amount of fluid to be admitted through the inlet valves thereof, when said valves are fully opened, thereby providing a flow control that is operative to effect proper speed in the operation of the hydraulic motor thereof.

A further object is to provide a hydraulic power steering valve mechanism wherein an inlet valve thereof is provided with pressure balancing means that is operative, in the neutral position of said valve, for exerting, against a portion of said valve, pressures which are equalized in both directions of axial movement of said valve.

The foregoing and other objects and features of the invention will become apparent as the disclosure is more fully made in the following detailed description of a preferred embodiment of the invention as illustrated in the accompanying sheets of drawings in which:

Fig. 3 is a longitudinal vertical sectional view of the proposed assembly taken substantially on the line 3—3 of Fig. 1 with parts of the mechanism being illustrated in elevation and parts in section, and shown with the control valves in neutral positions;

Fig. 4 is a fragmentary plan view of a portion of the steering column connecting mechanism shown in Fig. 3;

Fig. 5 is a longitudinal vertical sectional view generally similar to that of Fig. 3 but with the valves in position to admit fluid pressure to the left-hand end of the actuating hydraulic cylinder as a result of rotation of the operator's steering wheel in one direction;

Fig. 6 is a view generally similar to Figs. 3 and 5 but showing the valves conditioned to admit fluid pressure to the right-hand end of the actuating cylinder as a result of rotation of the operator's steering wheel in a direction opposite to that shown in Fig. 5;

Figure 1:
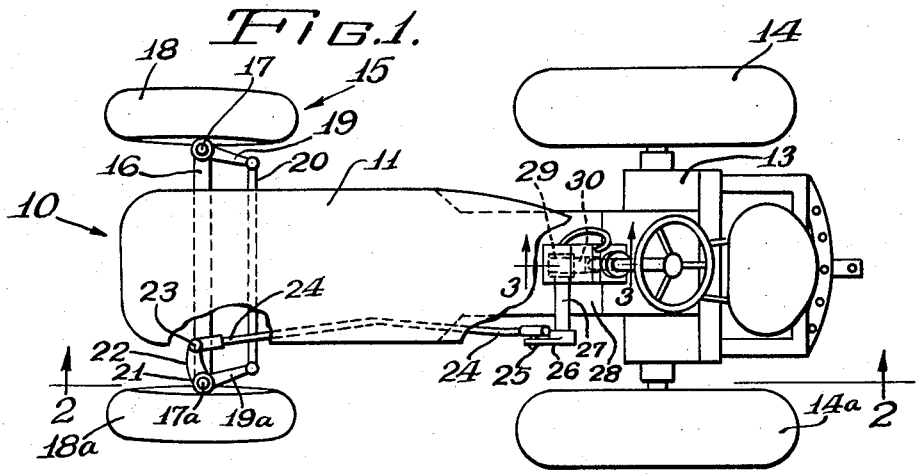
Fig. 1 is a top plan view of a tractor having the proposed mechanism incorporated therein, and shown with parts of the tractor broken away so as to better illustrate the invention.
Figure 2:
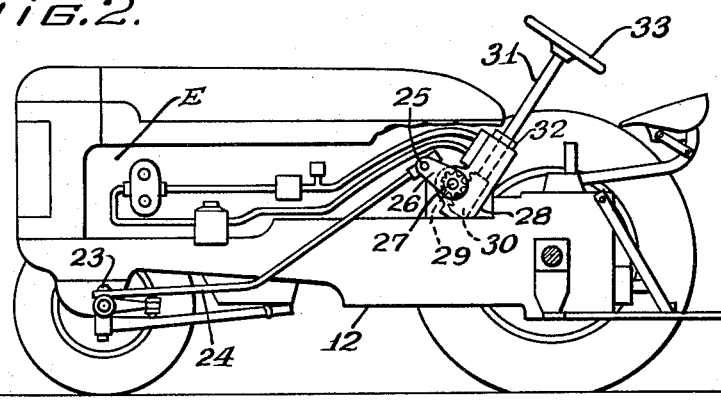
Fig. 2 is a longitudinal sectional view of the structure shown in Figure 1 and taken substantially on the line 2—2 of Fig. 1.
Figure 7:
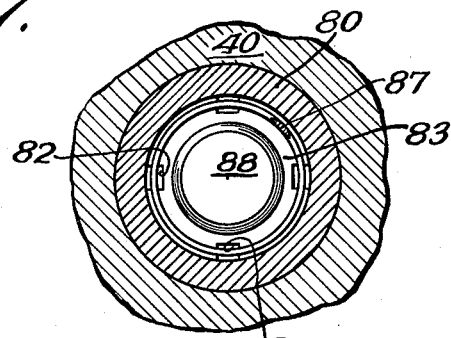
Fig. 7 is a vertical sectional view of one of the exhaust valves taken substantially on the line 7—7 of Fig. 3.

Referring now to the drawings, it will be seen that the proposed device finds ready application for incorporation into a generally conventional tractor vehicle. Such a tractor, indicated generally by the reference numeral 10, will be seen to include a longitudinal body 11 and a framework 12, and the rear end thereof is supported from a transverse housing, such as 13, which is carried by a pair of traction wheels 14, 14a, while the forward end thereof is carried by a steering truck assembly indicated at 15. Said truck includes a transverse axle member 16 connected to the frame 12, and wheel spindle supporting assemblies 17, 17a carried at opposite ends of the axle member 16 and journalling a pair of forward steerable dirigible wheels 18, 18a which are interconnected for coordinated movement about the vertical axes of assemblies 17, 17a by means of a steering linkage which includes the rearwardly extending lever arms 19, 19a forming part of said assemblies, the arms being pivotally interconnected by a tie rod 20. One of the lever arms 19a, the lower one as viewed in Fig. 1, may be formed as part of a bell-crank 21 which has its other arm 22 pivotally connected at 23 to one end of a drag-link 24 which extends rearwardly and is pivotally connected, as at 25, at its other end to the lower end of a pitman arm or operating lever 26 whose opposite end is mounted on a stub output or pivot shaft 27. The shaft 27 is rotatably supported from a gear casing or housing 28, in turn, mounted on the frame 12, and said casing encloses the inner end of said shaft upon which is mounted, and constrained for rotation therewith, a spur gear 29 which meshes with a gear rack 30 that is actuated, through appropriate interconnecting mechanism, by a steering shaft 31 forming part of a steering column and extending through a sleeve bearing 32 suitably affixed to said gear casing, said latter shaft being provided at its upper end with an operator's control or steering wheel 33 which is constrained for rotation therewith.

It will be evident from the above that rotation of the operator's steering wheel 33 in one direction will cause rotation of the shaft 27 in one direction, while rotation of said steering wheel in the opposite direction will, of course, cause rotation of the pivot output shaft 27 in the reverse direction.

The steering column shaft 31, at the end thereof opposite the steering wheel 33, may be pivotally and slidably attached to a yoke member 34 by means of a pin 35 extending into aligned slotted openings 36, 36a provided in the spaced apart arms 37, 37a thereof, while the yoke, in turn, is mounted on one end of a shaft 38 and constrained for rotation therewith. The shaft 38 is journalled, by means of an anti-friction bearing 39, in a valve housing or casing 40 and said shaft further extends through an opening in the end wall 41 of gear casing 28. A fluid seal 42 mounted in the end wall 41 and another such seal 43 mounted in an axial extension 44, of a recess 45 formed in valve casing 40, provide means for sealing said shaft where it enters the respective casings. The inner end of shaft 38 is fashioned with an axially extending passage 46 that communicates at its inner or closed end with a radially extending passage 47, for purposes of relieving any fluid that may be trapped behind said shaft as will subsequently be more clearly understood, and a helical or worm thread 48 provided on the inner end of said shaft cooperates with a complementary helical or worm thread 49, in a ball nut 50, to provide helical grooves or tracks that contain the anti-friction ball bearing members 51. The ball nut 50, in turn, is positioned in a recess 52 in one end of a piston member 53 and secured against movement therewithin by suitable means such as the locking or set screw 54. An axial opening 55 in said piston is provided to receive the end of the shaft 38 that extends through ball nut 50.

The piston 53 is slidably disposed within the cylinder 56 which is formed as a chamber within the gear casing 28. A longitudinal axially extending portion 57 on one end of said piston member has the gear rack 30 formed on one side thereof, while diametrically opposite from said rack there is fashioned a foot-like pedestal support 58 that is dimensioned to slidably engage one wall of said cylinder and, coincident therewith, to support one end of said piston, thus restricting axial flexing of said extension and limiting displacement of said piston off of its longitudinal axis. Said cylinder may, if desired, be provided with an inner sleeve-like lining, as indicated at 59.

The control or distributor valve casing or housing 40 is mounted at one end of the gear casing 28 and secured thereto, by suitable means such as by a plurality of cap screws 60 (only one of which is shown), and conventional sealing means, such as the O rings indicated at 61, may be employed to make the juncture between the two casings relatively liquid-tight. The recess 45, in casing 40, cooperatively mates with a similar and axially aligned, but somewhat shallower, recess 45a, in the end wall 41 of casing 28, to provide a chamber or compartment for enclosing an actuating bearing assembly, indicated generally at 62, which is carried by the shaft 38. The actuating bearing assembly 62 includes a disc member 63 circumscribing the shaft 38 and disposed axially intermediate pressure plates 64 and 64a, positioned one on either side thereof, with roller ball members 65 and 65a, rolling in mating shallow annular grooves or tracks 66, 66, and 66a, 66a, respectively, formed in the opposed faces of the adjacently positioned members 64, 63, and 64a. The ungrooved face of plate 64a tightly abuts a rim or collar 67 carried by the shaft 38 while the ungrooved face of plate 64 abuts a washer 68 which, in turn, tightly abuts a hub-like lock-up nut 69 threadably affixed to the shaft 38, and a protective cap 70 may be provided for enclosing the rolling balls and tracks of said bearing assembly as indicated. As thus arranged said actuating bearing assembly is adapted to move axially with the shaft 38 but said shaft is free to rotate independently of any rotation of the disc 63 therearound. A fluid seal, such as shown at 71, may be capped over shaft 38 and around the opening where said shaft enters the valve casing 40 to provide a liquid tight entry for the shaft thereinto.

A transverse bore 72, in valve casing 40, opens at one end thereof into the recess 45 and at its opposite end into a longitudinal bore 73 that extends through said casing. The edge of actuating bearing disc 63 is received in a distended slot-like opening 74 in an actuator member 75 which, in turn, is mounted for rockable or toggle-like movement within the transverse bore 72 by means of a rim 76 having a semi-spherical edge 77 thereon that pivotally engages the inner surface of said bore and permits rocking or fulcruming of said actuator member on a lateral axis indicated at "A." The opposite end of said actuator is provided with a curved, raised rim or knob-like head portion 78 that is disposed between and in contact with a pair of coaxially arranged, axially spaced and oppositely facing tappets or exhaust valves 79, 79a, slidably positioned, respectively, within a pair of sleevelike linings or bushing members 80, 80a, mounted within the longitudinal bore 73. Since both of the sleeve linings and both of the exhaust valves are identical structures only one of each need be described herein, the opposite number thereof being oppositely disposed and shown by the same reference character with the suffix "a" added thereto. Said tappet valve 79 has a main body portion 81 that is dimensioned for slidable movement axially within the sleeve lining 80, and is provided with a plurality of peripherally spaced and longitudinally extending slot-like flutes 82 which open at one end into the transverse bore 72 and at the opposite end into a shoulder portion 83 that adjoins an extended reduced diameter portion 84 of said exhaust valve. An inwardly extending annular shoulder 85, on a reduced diameter portion 86 of each sleeve 80, serves as an abutment for one end of a coil spring 87 whose opposite end abuts the shoulder 83 of said exhaust valve 79 and thus tends to urge said exhaust valve into constant engagement with the actuator member 75. The inner end of each exhaust valve 79 is fashioned with a smooth flat face 88 for purposes which will presently be clearly understood.

A pair of axially spaced inlet valves 89, 89a, coaxially arranged with respect to one another and with said exhaust valves, are disposed in oppositely facing relationship within the respective sleeve linings 80 and 80a mounted within the longitudinal bore 73, and being of identical construction only one such valve need be described in detail. These inlet valves are of the poppet balanced type and each valve includes a body portion, such as 90, which is dimensioned for axially slidable positioning within the reduced diameter portion 86 of sleeve bushing 80. One end face of said inlet valve is fashioned with a smooth flat surface 91 that is adapted upon movement of the valve to engage the flat face 88 on the respective adjoining exhaust valve, while the opposite end of said inlet valve is provided with an enlarged poppet or head 92 that is adapted upon movement of the valve to seat against a corner edge of the reduced diameter portion 86 of sleeve 80. An annular groove or annulus 93, on said body adjoining the poppet 92, is provided for purposes which will presently be understood, and an opening 94 extending through said inlet valve body opens at one end into an enlarged end recess 95 therein. A compressible coil spring 96 positioned within the sleeve or bushing 80 is disposed so that one end thereof abuts the poppet 92 and tends to urge it into seating position against the seating edge of sleeve section 86, while the opposite end of said spring seats or rests in a spring supporting cup 97, which, in turn, is suitably positioned by a snap ring 98 mounted in the sleeve 80. An O type fluid sealing ring 99, mounted in an annular groove in the body portion 90 of inlet valve 89, restricts the flow of fluids along adjoining surfaces of the sleeve 80 and said inlet valve, while an additional sealing ring 100, in an annular groove around the exterior of sleeve 80, serves to restrict the flow of fluids between adjoining surfaces of said sleeve and the longitudinal bore 73 of valve casing 40.

The annulus 93 in each inlet valve 89 communicates, by way of a plurality of radially extending circumferentially spaced openings 101, with an interior annular groove or annulus 102 which opens into the bore 73 of valve casing 40. The annuli, 102, 102a, in turn, communicate by way of a pair of passages 103, 103a, with a longitudinally extending passage 104 provided in a header member 105 that is suitably secured to the exterior of valve casing 40, while a port opening 106 in said header opens into passage 104 and is adapted for communication with a source of fluid pressure. Lock nuts 107 and 107a threadably affixed on sleeves 80 and 80a, respectively, may be provided to effect longitudinal axial movement of said sleeves thereby permitting adjustment or variation of the spacing between the opposed faces 88 and 91 of valves 79 and 89, and between opposed faces 88a and 91a of valves 79a and 89a. Such adjustment may be found desirable in order to obtain effective operation in the admission and exhaustion of fluid through these valves.

A conduit 108 connects the inlet port opening 106, of header 105, with the discharge side of an accumulator 109, while the intake side of said accumulator is connected by a conduit 110 to a pressure unloading valve 111 and with the discharge side of a pump 112 that may be operated through suitable driving mechanism (not shown) by the engine, indicated at E, of the tractor vehicle. The intake of said pump may be connected by conduit 113 with a reservoir source of hydraulic fluid 114 and said reservoir is connected by way of conduit 111a with the valve 111, and by way of conduit 115 with discharge port 116 which opens into the transverse bore 72 of valve casing 40. Conduit 117 connects the outer end of the right-hand sleeve 80 with a port opening 118 in gear casing 28 which opening, in turn, communicates with the left-hand end of cylinder 56, and conduit 119 connects the outer end of the left-hand sleeve 80a with a port opening 120, in gear casing 28, which opening communicates with the right-hand end of cylinder 56, through an annulus 121 and a plurality of radially extending openings 122 (only one of which is shown), to complete the hydraulic circuit for the device.

Since the components of the hydraulic system, such as the accumulator, unloading valve, pump and reservoir, are all conventional in structure and operation and since their functions are so well understood in the art, it is believed no further description of the details thereof need be enumerated upon herein.

Figure 8:
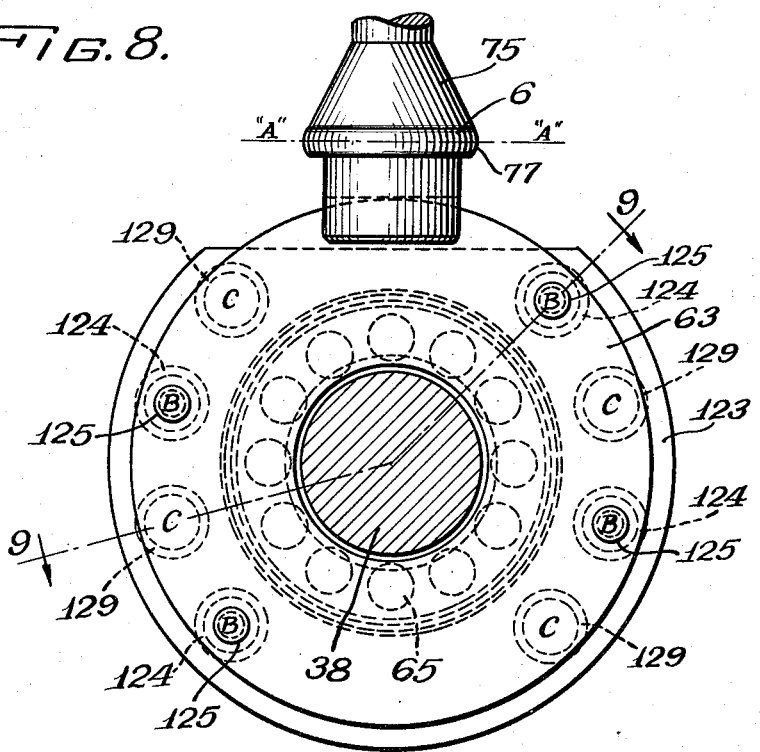
Fig. 8 is a vertical sectional view of a portion of the actuator bearing assembly taken on line 8—8 of Fig. 3.
Figure 9:
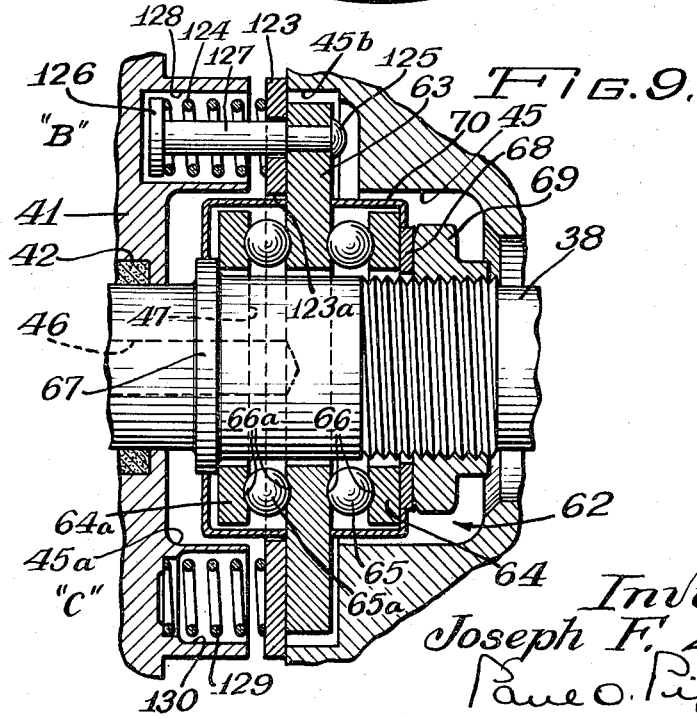
Fig. 9 is a generally horizontal sectional view of the actuator bearing assembly taken on line 9—9 of Fig. 8.

The actuator bearing assembly 62 which is carried by the shaft 38, as previously mentioned, is axially movable with said shaft upon the turning or rotation thereof. The centering or the returning of said assembly to its neutral position, wherein the actuator member 75 is disposed midway between the oppositely disposed exhaust valves 79, 79a, is accomplished by a plurality of circumferentially spaced reaction members arranged in two alternately disposed sets or groups which are oppositely reactive. One such set, indicated generally by the letter "B," is arranged so as to form the outline of a rectangle, as best illustrated in Fig. 8, while the second set, indicated at "C," forms a similarly appearing rectangle, the outline of which may be said to overlap or interlock the rectangular outline of the said first set. Both of these sets of members are disposed to react against a circular plate 123 juxtaposed alongside the actuator disc 63. The plate 123 is slightly larger in diameter than the disc 63 and is provided with a central opening 123a that permits it to circumscribe the cap cover 70 of said bearing assembly. The diameter of said plate is such that it will overlap the edges of an enlarged portion 45b of the recess 45 and thereby provide a stop or an abutment the purpose of which will subsequently be more fully explained.

The "B" set of reaction members may be formed with a plurality of coil springs 124 circumferentialy spaced around said bearing assembly. Each of said springs is positioned around the shank of a headed pin 125, the head of which tightly abuts the outer surface of disc 63 while the shank thereof additionally extends through openings in said disc and plate and is anchored in a bumper or abutment member 126 affixed to the opposite end of said shank. Each spring member 124 is thus compressibly positioned between a bumper 126 and the inwardly facing surface of plate 123. The shank of each pin 125 is provided with an enlarged diameter portion 127 that is dimensioned to extend through the shank opening in plate 123 but is too large to extend through the shank opening in disc 63 so that one end of said enlarged portion abuts the inwardly facing surface of disc 63 and fixedly secures the pin 125 to said disc whereby the pin moves axially with the disc. A plurality of circumferentially spaced recesses 128, in the wall 41 of casing 28, are provided to receive the inwardly extending ends of springs 124 and their associated pin members 125.

The "C" set of reaction members is constituted by a plurality of coil springs 129 circumferentially spaced around the bearing assembly 62. Said latter springs are compressibly positioned with one end of each abutting the inwardly facing surface of plate 123, while the opposite end thereof is seatably received in a respective recess 130 suitably formed in the end wall 41 of casing 28.

When the shaft 38 is rotated counterclockwise, as in making a left turn, and the bearing assembly 62 is moved axially to the left, as viewed in Figs. 3, 5, and 6, the "C" set of springs 129 are compressed while the reaction in the "B" set of springs 124 remains undisturbed. Hence, when the turning force is removed from the steering wheel 33, the springs 129 are free to react and return the bearing assembly to its centered position. On the other hand, when the shaft 38 is rotated clockwise, as in making a right turn, the bearing assembly 62 moves axially to the right, as viewed in Figs. 3, 5, and 6. In this case, the "B" set of springs 124 are compressed because the plate 123 is prevented from moving axially to the right by the edge portions of the enlarged recess 45b while the pins 125 carry the bumpers 126 with them and thereby compress said springs, at the same time the reaction in the "C" set of springs 129 remains undisturbed. Now when the force is removed from the steering wheel 33, the springs 124 become free to react and return the bearing assembly to its centered position.

*Operation*

To explain the operation of the proposed power steering mechanism it is assumed that, initially, the vehicle is moving or tracking along a straight path and the forward steering or dirigible wheels are in a centered position. This being the case, the hydraulic distributor or control valves will come to rest in their neutral positions and, with these valves so disposed, both ends of the cylinder 56 will have free communication through the exhaust port opening 116 with the reservoir 114, and the hydraulic pressures operating against opposite sides of the piston 53 will be substantially equalized. When this condition prevails, the geometry of the steering system will tend to maintain the forward dirigible wheels self centered, while simultaneously therewith the springs 124 and 129, operating on the disc 63 of the actuating bearing assembly 62, will tend to center the associated actuator member 63 and urge it into its mid position between the exhaust valves or tappets 79 and 79a. Simultaneously, said valves will be urged by their respective springs 87 and 87a, into engagement with the opposite sides of the knob 78, on said actuator, but the inner faces 88 and 88a thereof will be maintained slightly spaced from the respective opposed faces 91 and 91a of the inlet valves 89 and 89a. At the same time said inlet valves will be urged by their respective reaction spring members 96 and 96a to seat the poppet heads 92 and 92a of said valves against the edges of the reduced diameter sleeve portions 86 and 86a, thereby sealing off the source of fluid pressure and preventing fluid from entering the cylinder 56 by way of openings 101 and 101a and the respective annular areas 93 and 93a communicating therewith. With said exhaust and inlet valves thus positioned, fluid may now flow freely from the right-hand end of cylinder 56 through openings 122, annulus 121, port 120, conduit 119, the axial opening 94a of inlet valve 89a, around the face 88a of valve 79a and through the flutes 82a thereof into the bore 72, from whence the fluid is discharged through port 116 by way of conduit 115 into the reservoir 114. Concurrent therewith fluid may also flow freely from the left-hand end of cylinder 56 through port 118, conduit 117, axial opening 94 of inlet valve 89, around the face 88 of valve 79 and through the flutes 82 thereof into the bore 72, from whence the fluid may be discharged as before through port 116 and conduit 115 into the reservoir 114. With the mechanism thus conditioned, the components thereof being disposed as illustrated in Figure 3, any slight variations in the track or path of the dirigible steering wheels tending to turn them will, initially, encounter only the reaction or resistance set up by the geometery of the steering mechanism or any limited static resistance resulting from the static head of fluid within the cylinder, or by the muscular reactive effort of the operator, because both ends of the cylinder 56 will be in free communication with the source of fluid in the reservoir, thus there will be no tendency for the hydraulic fluid within the system to exert any force or influence opposing movement of the piston within said cylinder.

Now let it be assumed the vehicle operator desires to make a left-turn, and the steering wheel 33, accordingly, is turned to the left. Such rotation, registering through the interconnecting mechanism that includes steering shaft 31, pin 35 and yoke 34, will, in turn, cause the worm shaft 38 and the worm track 48 on the opposite end thereof to rotate, but, since the reaction of the piston rack 30 against gear 29 and pivot shaft 27 upon which it is mounted is greater than that between worm shaft 38 and piston 53 said piston will not move. This being the case, the worm shaft 38, by virtue of its rolling ball-in-thread connection with the piston, will be urged to move axially inwardly carrying with it the disc 63 which, being engageable with the actuator member 75, will cause said actuator to fulcrum or rock clockwise about the lateral axis passing through "A" on the rim 76 thereof thereby causing the head or knob 78 on the actuator to slidably force the exhaust tappet 79 to the right, all as viewed in Fig. 5. When exhaust valve 79 has moved a distance sufficient to close the space between opposed faces 88 and 91 of the respective adjacent valves, the axial opening 94 through the inlet valve 89 is sealed off thus restricting the free flow of fluid from the left-hand end of cylinder 56 to the reservoir 114. Coincident with the movement of the actuator knob 78 to the right, or clockwise as viewed in Fig. 5, exhaust valve 79a, urged on by the reaction of spring 87a, follows said actuator knob and in so doing increases the space between opposed faces 88a and 91a of the respective adjacent valves, thus providing an increased cross-sectional area for a portion of the passage used by the fluid flowing out of the right-hand end of cylinder 56. Further or continued rotation of the steering wheel 33 will cause the actuator 75 to continue its clockwise rocking movement resulting in further axial movement of the exhaust valve 79. This additional movement of exhaust valve 79 will cause a corresponding axial movement of the adjacent inlet valve 89 which will force said latter valve off of its seat on the inner sleeve 80 and thereby open up a peripherally extending or annular orifice around the poppet head 92 thereof whereby fluid from adjoining annulus 93 may flow out through the open end of said sleeve into conduit 117 and through port 118 into the left-hand end of cylinder 56. Admission of fluid under pressure into said cylinder operates to react against the left-hand side of piston 53 forcing it to the right and thus aiding or supplementing the operator with his turning effort.

While the poppet head 92 of inlet valve 89 is seated against the edge of sleeve 80 this valve is pressure balanced because, as will be seen from the drawings, the fluid pressure in annulus 93 reacts equally against the axially spaced opposite walls of the annulus thus directing a pressure that reacts axially in both directions with equal force. However, as soon as the poppet 92 is unseated this valve becomes unbalanced by virtue of the fact that the area of the inclined inner seat portion of the poppet head and the area of the outer face of said poppet then become available to receive the pressure of the fluid, but, since the surface areas of these elements are not of equal dimensions, the resultant effect is an unbalance wherein the total fluid pressure on the valve urging it to the left is slightly greater than that urging it to the right. This unbalance of pressure interposes an additional reaction, reflected through the actuator and its associated bearing elements to the steering wheel, which the operator must manually overcome in turning the wheel and such reaction creates what is commonly spoken of as a sense of "feel" in the wheel. This sense of feel is generally lacking in the power steering mechanisms of the type proposed herein. It is most desirable, however, because it serves to provide the operator with a sensitivity that permits the exercise of a greater degree of control over the vehicle. Since the opposite inlet valve 89a remains seated while valve 89 is unseated it will be appreciated that the former valve remains in its pressure balanced state and thus does not produce any reaction that is manifested against the steering effort.

The openings 101 and 101a, which admit fluid under pressure through the sleeve bushings 80 and 80a into the respective inlet valves 89 and 89a, function as metering means in that they allow fluid to flow only up to a predetermined amount even when the valve is fully opened. As thus constructed the speed of turning of the vehicle's dirigible wheels, or of the operation of the piston 53 within cylinder 56, is not directly proportional to the speed of the vehicle's engine, as it was in many prior devices where the steering was accelerated proportionally to the acceleration of the engine's speed and to the increased displacement of the associated hydraulic pump, because the present power steering unit receives its fluid pressure from an accumulator source of stored hydraulic power and the fluid pressure received therefrom is not proportional to the speed of the vehicle's engine or of the hydraulic pump thereof. This control feature of the mechanism prevents a too rapid directional change of the dirigible wheels and thus functions as a flow control that is operative to provide the proper speed for maximum turning.

Upon completion of a turn the operator has only to release or relax his hold on the steering wheel 33 in order to effect a recovery since the geometry of the steering mechanism will straighten out and self center the front dirigible wheels. At the same time, the springs 124 and 129 reacting against the disc 63 will operate to center the actuating bearing assembly 62 and to position the actuator member head 78 in its mid or neutral point in the bore 72, whereupon the exhaust tappets 79, 79a urged by their respective springs 87 and 87a will return to their neutral positions in contact with said head, while the inlet valves 89 and 89a urged by their respective spring members 96 and 96a will be seated against their respective sleeve bushing portions 86 and 86a and the flow of fluid from the source will be stopped. In the condition the valves again will permit free communication between the opposite ends of the cylinder 56 and the reservoir 114 and pressures against opposite sides of the piston 53 will be equalized.

When a right turn is maneuvered, the opposite set of valves go through the same sequence of operations above described.

It will readily be appreciated from the above description that the proposed invention provides a very advantageous means for incorporating a power steering mechanism in the form of a packaged unit that employs many conventional components. It will also be recognized that the proposed unit provides a power steering mechanism that creates the sense of "feel" so highly desirable to the operator in this type mechanism. Furthermore, a unit such as proposed provides a highly desirable degree of control over the rate of turning and, in addition, is particularly adaptable to an accumulator type of hydraulic system.

While only one form of the invention has been shown, it will be obvious to those skilled in the art that it is not so limited, but is susceptible of various changes and modifications without departing from the spirit thereof, and it is desired therefore, that only such limitations shall be placed thereupon as are specifically set forth in the appended claims.

I claim:

1. In a vehicle having mechanism including an operator's controlling portion for manual steering of the dirigible wheels thereof, a hydraulic power transmission system comprising in combination a reservoir for hydraulic fluid, a pump operable to forcibly deliver hydraulic fluid pressure through the system, a hydraulic accumulator, a servo-motor comprising a pressure cylinder, a piston reciprocally contained therein, and operatively connected with the dirigible wheels to effect their steering movements in opposite directions in accordance with movements of the piston in opposite directions from an intermediate position in the cylinder, a valve mechanism including a plurality of valve elements coaxially positioned and arranged in sets of two elements each with the sets spaced apart from one another and being slidably disposed and actuable for application of hydraulic fluid pressure to the servo-motor and including a valve housing affixed to and constrained against movement relative to said pressure cylinder, and having oppositely disposed and coaxially extending ports connected, respectively, with the opposite ends of the pressure cylinder, and with axially spaced inlet and outlet ports connected with the hydraulic power transmission system, means biasing said valve mechanism to a normally neutral position that establishes free communication of hydraulic fluid between said servo-motor and said reservoir, a valve actuator rockably positioned within said housing and mechanically and operatively connected to the operator's controlling portion of said steering mechanism and operable upon initial movement of the controlling portion of said steering mechanism to actuate said valve mechanism to effect the application of hydraulic fluid pressure to the cylinder to move the piston accordingly, and having said valve mechanism further fashioned with means therein operative upon actuation of the valve mechanism for creating an unbalance of pressures acting against said valve mechanism and which opposes the actuation of said valve mechanism.

2. In a vehicle having mechanism including an operator's controlling portion for manual steering of the dirigible wheels thereof, a hydraulic power transmission system comprising in combination a reservoir for hydraulic fluid, a pump operable to forcibly deliver hydraulic fluid pressure through the system, a hydraulic accumulator, a servo-motor comprising a pressure cylinder, a piston reciprocally contained therein, and operatively connected with the dirigible wheels to effect their steering movements in opposite directions in accordance with movements of the piston in opposite directions from an intermediate position in the cylinder, a valve mechanism actuable for application of hydraulic fluid pressure to the cylinder of said servo-motor, said valve mechanism including a housing secured to and constrained against movement relative to said pressure cylinder and having oppositely disposed and coaxially extending ports connected, respectively, with the opposite ends of said pressure cylinder, and having axially spaced inlet and outlet ports connected, respectively, with said accumulator and said reservoir, a pair of spaced apart coaxially arranged and oppositely positioned exhaust valve elements slidably disposed within said housing, a pair of spaced apart oppositely positioned inlet valve elements coaxially arranged with respect to said exhaust elements, each of which adjoins and is engageable with a respective exhaust valve element, and slidably positioned with said housing, said elements being selectively operable for controlling the passage of hydraulic fluid under pressure between predetermined ports of said housing, yieldable means disposed within said housing normally urging said valve elements to a predetermined position establishing free communication of hydraulic fluid between the opposite ends of said cylinder and said reservoir, a valve element actuator pivotally positioned within said housing and engageable with each of said exhaust valve elements, said actuator being mechanically and operatively connected to the operator's controlling portion of said steering mechanism and operable upon initial movement of the controlling portion of said steering mechanism to actuate said valve mechanism to effect the application of hydraulic fluid under pressure to one end of said cylinder to move the piston accordingly and concurrent therewith to maintain free communication of the opposite end of said cylinder with said reservoir, and having said valve mechanism further fashioned with separate means disposed in the path of fluid flow between said inlet port and each of said inlet valve elements for metering the flow of hydraulic fluid into said servo-motor for preventing a too rapid directional change of the dirigible wheels of the vehicle.

3. In a vehicle having mechanism including an operator's controlling portion for manual steering of the dirigible wheels thereof, a hydraulic power transmission system comprising in combination a reservoir for hydraulic fluid, a pump operable to forcibly deliver hydraulic fluid pressure through the system, a hydraulic accumulator, a servo-motor comprising a pressure cylinder, a piston reciprocally contained therein, and operatively connected with the dirigible wheels to effect their steering movements in opposite directions in accordance with movements of the piston in opposite directions from an intermediate position in the cylinder, a valve housing affixed to and constrained against movement relative to said pressure cylinder and having oppositely disposed and coaxially extending ports connected, respectively, with the opposite ends of the pressure cylinder, and having axially spaced inlet and outlet ports connected, respectively, with the accumulator and reservoir of said system, a plurality of valve elements coaxially positioned and arranged in sets of two elements each with the sets spaced apart from one another and being slidably disposed within said housing and selectively operable for controlling the passage of hydraulic fluid under pressure between predetermined ports of said housing, yieldable means disposed within said housing normally urging said valve elements to a predetermined position that establishes free communication of hydraulic fluid between the cylinder of said servo-motor and said reservoir; a valve element actuator pivotally positioned within said housing and mechanically and operatively connected to the operator's controlling portion of said steering mechanism, said actuator being operable upon initial movement of the operator's controlling portion of said steering mechanism to engage one valve element of a set and to actuate all the elements of that respective set to effect the application of hydraulic fluid pressure to said cylinder to move the piston accordingly, and having one valve element of each set other than the valve element engaged by said actuator fashioned with portions thereon which upon movement of the respective valve element are operative for creating an unbalance of pressure acting against the said respective element and which opposes the movement thereof and concurrently that of said actuator.

4. In a control for a hydraulic motor, having a cylinder with a piston reciprocally mounted therewithin, in combination; a housing having spaced apart coaxially extending and oppositely disposed work ports adapted for connection, respectively, with opposite ends of the cylinder of said hydraulic motor, and having axially spaced inlet and exhaust ports therein adapted for connection, respectively, with a source of hydraulic pressure and with a source of hydraulic fluid; spaced apart, coaxially arranged and oppositely positioned exhaust valve elements slidably disposed within said housing; oppositely positioned inlet valve elements coaxially arranged with respect to said exhaust valve elements, one each of which adjoins and engages with a respective exhaust valve element, and being slidably positioned within said housing; said valve elements being selectively operable for controlling the passage of hydraulic fluid between predetermined ports of said housing; yieldable means normally urging said valve elements to predetermined positions that establish free communication between said work ports and said exhaust port; actuator means including a member positioned within said housing and extending into the space between and being selectively engageable with certain of said valve elements, and operative to effect the establishment of communication between one of said work ports and said inlet port while concurrently therewith maintaining free communication between the other of said work ports and said exhaust port.

5. In a control for a hydraulic motor, having a cylinder with a piston reciprocally mounted therewithin, in combination; a housing having spaced apart coaxially extending and oppositely disposed work ports adapted for connection, respectively, with opposite ends of the cylinder of said hydraulic motor, and having axially spaced inlet and exhaust ports therein adapted for connection, respectively, with a source of hydraulic pressure and with a source of hydraulic fluid; a pair of spaced apart, coaxially arranged and oppositely positioned exhaust valve elements slidably disposed within said housing; a pair of spaced apart and oppositely positioned inlet valve elements coaxially arranged with respect to said exhaust valve elements, each of which adjoins and cooperates with a respective exhaust valve element, and being slidably positioned within said housing; said valve elements being selectively operable for controlling the passage of hydraulic fluid between predetermined ports of said housing; yieldable means disposed within said housing normally urging said valve elements to predetermined positions establishing free communication between said work ports and said exhaust port; actuator means including a member pivotally positioned within said housing and extending into the space between and being selectively engageable with each of said exhaust valve elements, and operative to effect the establishment of communication between one of said work ports and said inlet port while concurrently therewith maintaining free communication between the other of said work ports and said exhaust port.

6. In a control for a hydraulic motor, having a cylinder with a piston reciprocally mounted therewithin, in combination; a housing having a portion thereof disposed on an axis spaced from and parallel to the reciprocating axis of the piston and having provided in said parallel portion spaced apart axially aligned and oppositely disposed work ports adapted for connection, respectively, with opposite ends of the cylinder of said hydraulic motor, and having axially spaced inlet and exhaust ports therein adapted for connection, respectively, with a source of hydraulic pressure and with a source of hydraulic fluid; a pair of spaced apart, coaxially arranged and oppositely positioned exhaust valve elements slidably disposed within said housing; a pair of spaced apart and oppositely positioned inlet valve elements coaxially arranged with respect to said exhaust valve elements, each of which adjoins and is engageable with a respective exhaust valve element, and being slidably positioned within said housing; means formed in each of said valve elements defining longitudinally extending passageways for the transmission of fluid therethrough; said valve elements being selectively operable for controlling the passage of hydraulic fluid between predetermined ports of said housing; yieldable means disposed within said housing normally urging said valve elements to predetermined positions establishing free communication between said work ports and said exhaust port; actuator means including a member pivotally positioned within said housing and extending into the space between and being engageable with each of said exhaust valve elements, and operative in one position to effect the establishment of communication between one of said work ports and said inlet port while concurrently therewith maintaining free communication between the other of said work ports and said exhaust port, and in another position thereof to effect the establishment of communication between the other of said work ports and said inlet port while concurrently therewith maintaining free communication between the one of said work ports and said exhaust port.

7. In a control for a hydraulic motor, having a cylinder with a piston reciprocally mounted therewithin, in combination; a housing having a portion thereof disposed on an axis spaced from and parallel to the reciprocating axis of the piston and having provided in said parallel portion spaced apart axially aligned and oppositely disposed work ports adapted for connection, respectively, with opposite ends of the cylinder of said hydraulic motor, and having axially spaced inlet and exhaust ports therein adapted for connection, respectively, with a source of hydraulic pressure and with a source of hydraulic fluid; a pair of spaced apart, coaxially arranged and oppositely positioned exhaust valve elements slidably disposed within said housing; a pair of spaced apart and oppositely positioned inlet valve elements coaxially arranged with respect to said exhaust valve elements, each of which adjoins and is engageable with a respective exhaust valve element, and being slidably positioned within said housing; means formed in each of said valve elements defining passageways for the transmission of fluid therethrough; said valve elements being selectively operable for controlling the passage of fluid through said passageways so as to effect communication between predetermined ports of said housing; yieldable means disposed within said housing normally urging said valve elements to predetermined positions establishing free communication between said work ports and said exhaust port; actuator means including a member pivotally positioned within said housing and extending into the space between and being engageable with each of said exhaust valve elements, and being selectively operative to effect the establishment of communication between a work port and said inlet port while concurrently therewith maintaining free communication between the remaining work port and said exhaust port.

8. In a control for a hydraulic motor having a cylinder with a piston reciprocally mounted therewithin, in combination: a housing having spaced apart and oppositely disposed work ports adapted for connection, respectively, with opposite ends of the cylinder of said hydraulic motor, and having axially spaced inlet and exhaust ports therein adapted for connection, respectively, with a source of hydraulic pressure and with a source of hydraulic fluid; a pair of spaced apart, coaxially arranged and oppositely positioned tappet elements slidably disposed within said housing; a pair of oppositely positioned valve elements coaxially arranged with respect to said tappets and positioned, one adjoining and engaging with a respective one of said tappets, slidably within said housing; said tappets each having axially extending passages formed on the exterior thereof; said valve elements each having an axially extending opening therethrough; said tappet passages being arranged to cooperate with said valve element openings to provide passageways interconnecting said work ports with said exhaust port; said tappet and valve elements being selectively operable for controlling the passage of hydraulic fluid between predetermined ports of said housing; yieldable means disposed within said housing normally urging said tappet and valve elements to predetermined positions establishing free communication between said work ports and said exhaust port; actuator means including a member pivotally positioned within said housing and extending into the space between and being simultaneously engageable with each of said tappets, and being selectively operative to effect the establishment of communication between a work port and said inlet port while concurrently therewith maintaining free communication between the remaining work port and said exhaust port.

9. In a control for a hydraulic motor having a cylinder with a piston reciprocally mounted therewithin, in combination: a housing having axially aligned, spaced apart and oppositely disposed work ports adapted for connection, respectively, with opposite ends of the cylinder of said hydraulic motor, and having axially spaced inlet and exhaust ports therein adapted for connection respectively, with different portions of an hydraulic fluid pressure circuit; oppositely positioned, apart and coaxially arranged exhaust valve elements slidably disposed within said housing; oppositely positioned and spaced apart inlet valve elements coaxially arranged with respect to said exhaust valve elements, each adjoining and engageable with a respective exhaust valve element, and being slidably positioned within said housing; means formed in each of said valve elements defining axially extending passageways for the transmission of fluid therethrough; said valve elements being selectively operable for controlling the passage of fluid through said passageways and to effect fluid communication between predetermined ports of said housing; yieldable means disposed within said housing normally urging said valve elements into predetermined positions establishing free communication between said work ports and said exhaust port; fluid metering means formed in said housing and operative to meter the flow of fluid between said inlet port and each of said work ports to effect control of the rate of movement of the cylinder in an associated hydraulic motor, including a plurality of radially extending circumferentially spaced small diametered openings surrounding each inlet valve element and disposed in the path of fluid flow between said inlet port and a respective inlet valve element; actuator means including a member pivotally positioned within said housing and extending into the space between and being engageable with said valve elements, and being selectively operative to effect the establishment of communication between a work port and said inlet port while concurrently therewith maintaining free communication between the remaining work port and said exhaust port.

10. In a control for a hydraulic motor having a cylinder with a piston reciprocally mounted therewithin; in combination: a housing having axially aligned, spaced apart and oppositely disposed work ports adapted for connection, respectively, with opposite ends of the cylinder of said hydraulic motor, and having axially spaced inlet and exhaust ports adapted for connection, respectively, with different portions of an hydraulic fluid pressure circuit; oppositely positioned, spaced apart and coaxially arranged exhaust valve elements slidably disposed within said housing; oppositely positioned and spaced apart inlet valve elements coaxially arranged with respect to said exhaust valve elements, one adjoining and engageable with a respective exhaust valve element, and being slidably positioned within said housing, means formed in each of said valve elements defining axially extending pasageways for the transmission of fluid therethrough; said valve elements being selectively operable for controlling the passage of fluid through said passageways and to effect fluid communication between predetermined ports of said housing; yieldable means disposed within said housing normally urging said valve elements into predetermined positions establishing free communication between said work ports and said exhaust port; said inlet valve elements each being provided with an enlarged head on one end thereof, whereby upon movement of said respective inlet valve fluid pressure admitted through said inlet port becomes operative against an outwardly facing radially extending surface of said head to oppose the movement of said inlet valve; actuator means including a member pivotally positioned within said housing and extending into the space between and being engageable with certain of said valve elements; and being selectively operative to effect the establishment of communication between a work port and said inlet port while concurrently therewith maintaining free communication between the remaining work port and said exhaust port.

11. In a control for a hydraulic motor, having a cylinder with a piston reciprocally mounted therewithin, in combination; a housing having a portion thereof disposed on an axis spaced from and parallel to the axis along which said piston reciprocates and having provided in said portion spaced apart axially aligned and oppositely disposed work ports adapted for connection, respectively, with opposite ends of the cylinder of said hydraulic motor, and having axially spaced inlet and exhaust ports therein adapted for connection, respectively, with a source of hydraulic pressure and with a source of hydraulic fluid; a pair of spaced apart, coaxially arranged and oppositely positioned with respect to one another, inlet valve elements slidably disposed within said housing portion; a pair of spaced apart and oppositely positioned exhaust valve elements coaxially arranged with respect to said inlet valve elements and being slidably disposed within said housing portion axially intermediate said inlet valve elements; means formed in each of said valve elements defining passageways for the transmission of fluid therethrough, including a plurality of axially extending and circumferentially spaced slots in the exterior surface of each exhaust valve element and an axial opening extending through the interior of each inlet valve element; said valve elements being selectively operable for controlling the passage of fluid through said passageways so as to effect communication between predetermined ports of said housing portion; yieldable means disposed within said housing portion normally urging said valve elements to predetermined positions establishing free communication between said work ports and said exhaust port; actuator means including a member pivotally mounted within said housing and extending into a position axially intermediate said exhaust valve elements so as to be engageable therewith, and being selectively operative to effect the establishment of communication between a work port and said inlet port while concurrently therewith maintaining free communication between the remaining work port and said exhaust port.

References Cited in the file of this patent

UNITED STATES PATENTS

| | | |
|---|---|---|
| 2,246,461 | Cannon | June 17, 1941 |
| 2,396,643 | De Ganahl | Mar. 19, 1946 |
| 2,506,093 | MacDuff | May 2, 1950 |
| 2,634,708 | Davis | Apr. 14, 1953 |
| 2,801,619 | Folkerts | Aug. 6, 1957 |
| 2,827,123 | Lincoln et al. | Mar. 18, 1958 |
| 2,828,721 | Folkerts | Apr. 1, 1958 |

FOREIGN PATENTS

| | | |
|---|---|---|
| 954,075 | France | Dec. 19, 1949 |